US012658640B2

(12) United States Patent
Spilker et al.

(10) Patent No.: US 12,658,640 B2
(45) Date of Patent: Jun. 16, 2026

(54) LOCKING DEVICE FOR LINE CONNECTORS

(71) Applicant: HARTING Electric Stiftung & Co. KG, Espelkamp (DE)

(72) Inventors: Nicole Spilker, Lübbecke (DE); Daniel Wesseler, Georgsmarienhütte (DE); Joachim Krämer, Kirchlengern (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 269 days.

(21) Appl. No.: 18/560,418

(22) PCT Filed: Jun. 3, 2022

(86) PCT No.: PCT/DE2022/100417
§ 371 (c)(1),
(2) Date: Nov. 13, 2023

(87) PCT Pub. No.: WO2022/258108
PCT Pub. Date: Dec. 15, 2022

(65) Prior Publication Data

US 2024/0250472 A1 Jul. 25, 2024

(30) Foreign Application Priority Data

Jun. 10, 2021 (DE) ..................... 10 2021 115 005.1

(51) Int. Cl.
*H01R 13/627* (2006.01)
*H01R 13/633* (2006.01)

(52) U.S. Cl.
CPC ....... *H01R 13/6275* (2013.01); *H01R 13/633* (2013.01)

(58) Field of Classification Search
CPC .......................... H01R 13/6275; H01R 13/633
USPC .................................................. 439/345, 352
See application file for complete search history.

(56) References Cited

U.S. PATENT DOCUMENTS

| | | | | |
|---|---|---|---|---|
| 3,152,850 | A | 10/1964 | Nava et al. | |
| 6,030,244 | A | 2/2000 | Buckheit et al. | |
| 6,056,577 | A * | 5/2000 | Blanchet | H01R 13/639 439/352 |
| 7,175,464 | B2 * | 2/2007 | Ferderer | H01R 13/6272 439/352 |

(Continued)

FOREIGN PATENT DOCUMENTS

| | | | |
|---|---|---|---|
| DE | 1244499 | B | 7/1967 |
| DE | 3624678 | A1 | 1/1988 |

(Continued)

*Primary Examiner* — Hae Moon Hyeon
(74) *Attorney, Agent, or Firm* — Smartpat PLC

(57) ABSTRACT

A locking device for line connectors includes a first housing (10) and a second housing (12) that can be placed against one another in an engagement direction (A). A set of resilient locking tabs (26) are held on the first housing (10) by fastening elements and can be latchingly locked on locking projections (32) of the second housing (12). A release ring (38) can be slid on the housings (10, 12) in the engagement direction (A) and that has release slopes (42) for transferring the locking tabs (26) into a released position. The fastening elements and the locking projections (32) are in the form of pins (24, 34) that are set in peripheral walls of the two housings (10, 12).

8 Claims, 4 Drawing Sheets

(56) References Cited

U.S. PATENT DOCUMENTS

| | | | | |
|---|---|---|---|---|
| 8,257,105 | B2 * | 9/2012 | Schmidt | E05C 19/06 439/352 |
| 10,135,187 | B2 * | 11/2018 | Fukumoto | H01R 13/635 |
| 2006/0276070 | A1 | 12/2006 | Ferderer et al. | |
| 2013/0203279 | A1 * | 8/2013 | Schmidt | H02G 3/081 439/345 |

FOREIGN PATENT DOCUMENTS

| | | | | |
|---|---|---|---|---|
| DE | 202006004794 | U1 | 7/2007 | |
| DE | 102012104857 | A1 * | 12/2013 | H01R 13/6275 |
| DE | 202015008407 | U1 | 12/2015 | |
| EP | 1729377 | A1 | 12/2006 | |
| EP | 3312944 | A1 | 4/2018 | |
| JP | 2021057228 | A | 4/2021 | |

* cited by examiner

LOCKING DEVICE FOR LINE CONNECTORS

CROSS-REFERENCE TO RELATED APPLICATION

This application is a national stage application, filed under 35 U.S.C. § 371, of International Patent Application PCT/DE2022/100417, filed on Jun. 3, 2022, which claims the benefit of German Patent Application DE 10 2021 115 005.1, filed on Jun. 10, 2021.

TECHNICAL FIELD

The disclosure relates to a locking device for line connectors.

BACKGROUND

Locking devices serve, for example, to lock complementary plug-in connectors, for example electrical plug-in connectors, which are each received in one of the two housings, so that, as a result of the two housings being locked on one another, the plug-in connectors are also retained in their engagement position.

EP 1 729 377 discloses a locking device, in the case of which the fastening members are added on the wall of the first housing and define insertion slots, into which the fastening clips can be inserted. Correspondingly, the locking protrusions of the second housing are also formed by structures added on the housing wall.

In the priority application relating to the present application, the German Patent and Trade Mark Office searched the following prior art: DE 36 24 678 A1, DE 20 2006 004 794 U1, DE 12 44 499 A, U.S. Pat. No. 6,030,244 A and EP 1 729 377 A1.

SUMMARY

The disclosure relates to a locking device for line connectors, having a first housing and a second housing, which can be placed against one another in an engagement direction, having a set of elastic locking clips, which are retained on the first housing by fastening members and can be locked with latching action on locking protrusions of the second housing, and having an unlocking ring, which can be displaced on the housings in the engagement direction and has unlocking slopes for transferring the locking clips into an unlocked position.

In particular, the disclosure deals with locking devices for connectors which have relatively large dimensions, for example in the order of magnitude of a number of centimeters, so that it is also the case that the housings serving to receive the connectors have to have correspondingly large dimensions and are of a relatively high weight. Since relatively large forces can occur during the handling of these connectors and of the associated housings, the locking devices have to meet stringent stability-related requirements.

It is the object of the disclosure to create a locking device which can be efficiently produced in a large number of variants for connectors with different dimensions and different stability-related requirements.

This object is achieved in that the fastening members and the locking protrusions are designed in the form of pins which are embedded in circumferential walls of the two housings.

In the case of this locking device, there is therefore no need for either of the two housings to have special added structures for the locking clips. It is thus possible for the tool costs for manufacturing the housings to be considerably reduced. In order for the fastening members and the locking protrusions to be fitted in a stable manner, all that is required is for suitable bores to be made in the housing walls, the pin-like fastening members and locking protrusions then being anchored in the bores, for example by means of threaded or rivet connections. The numbers and positions of the locking clips can then be adapted flexibly to the respective shape and size of the housings and to the stability-related requirements.

Advantageous configurations are specified in the dependent claims. In one embodiment, the fastening members and the locking protrusions are formed by rivet pins. The locking protrusions can then be formed simply by rivet heads of these pins. The fastening clips can be formed, for example, by spring plates, which each have a hole for the rivet pin, which serves for fastening purposes. In a position which is offset in relation to the rivet hole, these spring plates can have a run-on slope for the locking protrusion as well as a further hole, into which, in the locked state, the locking protrusion engages. When the first housing is then placed onto the second housing, the run-on slopes of the spring plates run onto the locking protrusions and are thus widened elastically until such time as the locking protrusions latch into the openings in the spring plates. This creates a tension-resistant connection between the two housings, which can only be released again by the spring plates being curved away from the walls of the second housing with the aid of the unlocking slopes of the unlocking ring, and so the rivet heads, which serve as locking protrusions, are thereby freed again. The run-on slopes of the spring plates can serve, at the same time, as mating surfaces for the unlocking slopes.

An exemplary embodiment will be explained in more detail hereinbelow with reference to the drawings.

DETAILED DESCRIPTION

Figure 1:
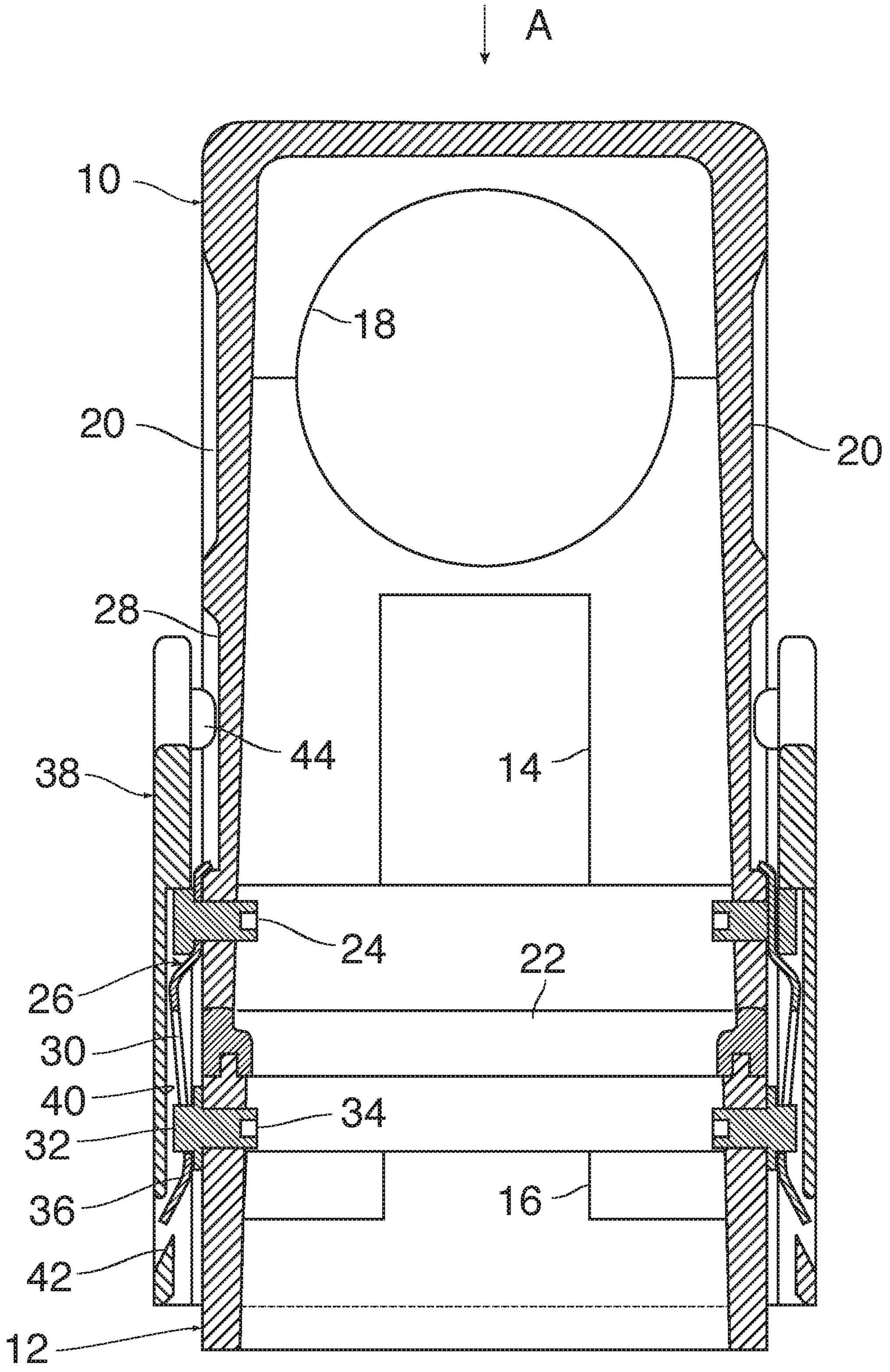
FIG. 1 shows an axial section through two locked-together housings of a locking device.

FIG. 1 shows, in an axial section, a first housing 10 and a second housing 12, which have been placed on one another in an engagement direction A and locked together. Each of the two housings 10, 12 serves to receive one of two complementary components of a plug-in connector (not shown), for example of an electrical plug-in connector. In the interior, the two housings 10, 12 have internal fittings 14, 16, which serve to position and fix the components of the plug-in connector. In addition, in the wall which is shown in the interior view of FIG. 1, the first housing 10 has a bushing 18 for an electric cable.

Grip hollows 20 are formed in the two sectionally illustrated walls of the first housing 10. As an example, it can be assumed that the housing has its width dimensioned such that it is just possible for the thumb and fingers of someone's hand to grip around it.

The two housings 10, 12 can be produced from plastic or also from metal.

On its upper edge, the second housing 12 has a seal 22, onto which the first housing 10 can be placed by way of its lower edge.

In the vicinity of its lower edge, the first housing 10 has, in each of the sectionally illustrated side walls, two rivet pins 24 auf, of which in each case only one is visible and is illustrated in section. Each rivet pin 24 engages, on the outer side of the housing, through a rivet hole in a locking clip 26, which in the example shown is formed by a strip of spring-steel sheet material. An angled upper edge of the locking clip engages in a shallow hollow 28, which is formed in the outer wall of the first housing 10. The locking clip 26 is thus positioned such that it extends vertically downward from the rivet pin 24. The head of the rivet pin 24 retains the locking clip such that it butts firmly against the outer wall of the housing 10. A part of the locking clip which is located beneath the rivet pin 24 is curved away from the housing wall and then runs obliquely downward onto the outer surface of the wall of the second housing 12. In this portion which runs obliquely onto the second housing 12, the locking clip has a slot 30, through which a locking protrusion 32 of the second housing 12 engages. This locking protrusion 32 is the head of a further rivet pin 34, which has been riveted firmly into the circumferential wall of the second housing 12. Beneath the rivet pin 34, the locking clip 26 forms a run-on slope 36, which is spread apart from the housing wall.

The two housings 10, 12 are enclosed, at the level of the seal 22, by an unlocking ring 38, which, on its inside, forms a pocket 40 for each locking clip, the heads of the rivet pins 24 and 34 and also the locking clip 26 being received in this pocket. On its lower edge, the unlocking ring 38 forms an unlocking slope 42, which in the state shown in FIG. 1 is located some way beneath the run-on slope 36 of the locking clip.

The unlocking ring 38 is guided on the first housing 10 such that it can be displaced axially, that is to say parallel to the engagement direction A. The upper edge of the pocket 40 forms a stop for the head of the rivet pin 24, and this limits the freedom of movement of the unlocking ring in the downward direction in FIG. 1. Further above, the unlocking ring has two protrusions 44, which are located at the same height and each engage in one of the hollows 28 and thus limit the freedom of movement of the locking ring in the upward direction.

The first housing 10 can be mounted on the second housing 12, and locked thereon, in the following manner. First of all, the unlocking ring 38 is pushed into its lower end position or it drops into the lower end position of its own accord when the upper part of the first housing 10 is gripped. The housing 10 is then placed onto the seal 22, wherein the locking ring 38 is pushed over the heads of the rivet pins 34 by way of its lower part. The locking clips 26 run onto the heads of these rivet pins 34, by way of their run-on slopes 36, and are thereby temporarily spread elastically outward. As soon as the lower edges of the slots 30 have passed the rivet heads, the locking clips spring back elastically into the position shown in FIG. 1 and the locking is established. Those parts of the unlocking ring 38 which form the bottom of the pockets 40 prevent the locking clips 26 from spreading elastically outward and coming loose from the locking protrusions 32.

Figure 2:
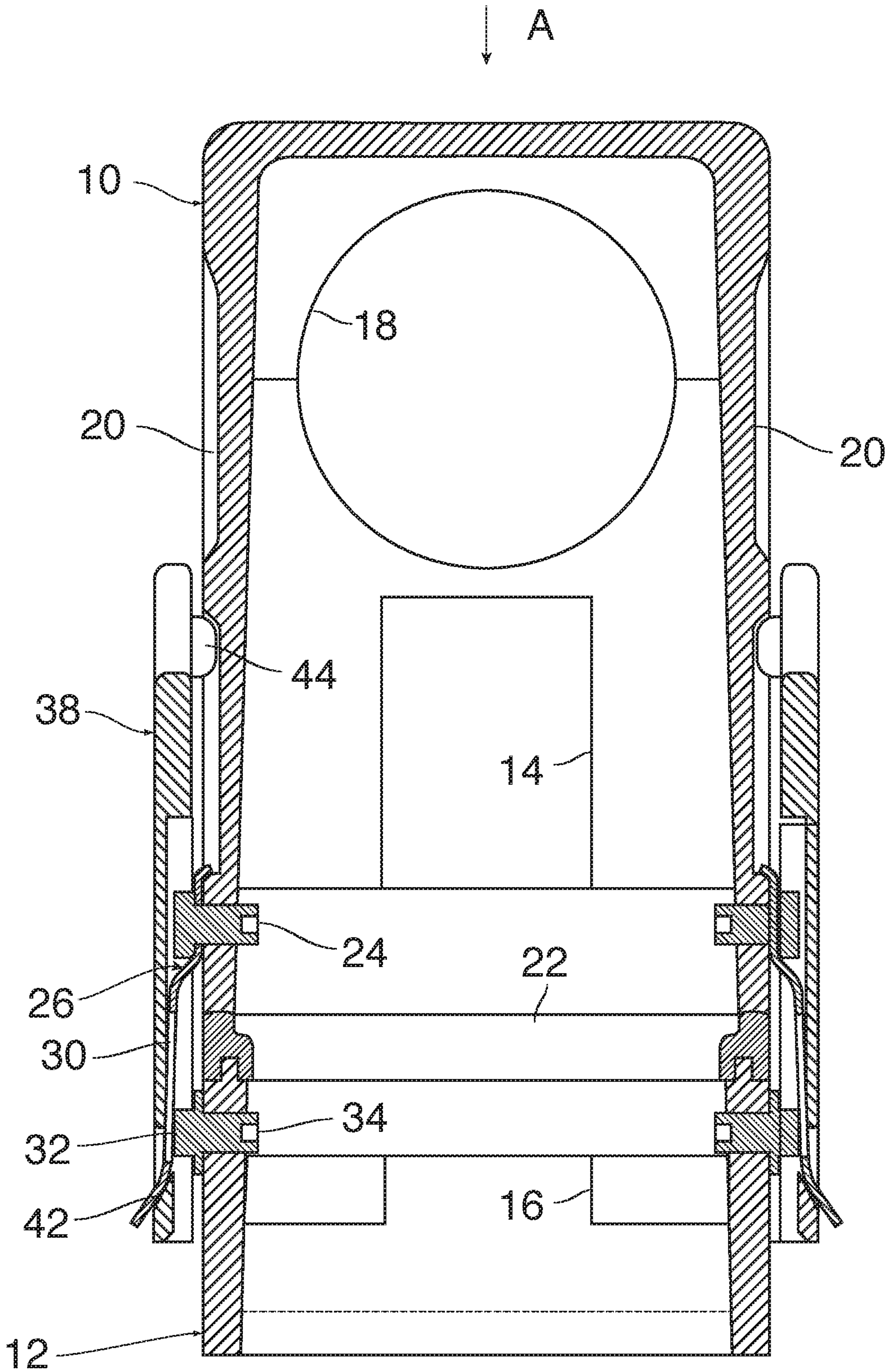
FIG. 2 shows the locking device according to FIG. 1 in the unlocked state.

When the locking is to be released, then the unlocking ring 38 is pulled upward into the position shown in FIG. 2. The unlocking slopes 42 here slide onto the curved-out, lower ends of the locking clips 26 and cause them to spread outward. Since the entire locking ring 38 has moved upward, the locking clips 26 can be spread outward until such time as that part which forms the slot 30 butts against the bottom of the pocket 40 and the locking protrusion 32 has come out of the slot. The locking ring 38 here reaches its upper end position. If it is pulled further upward, then the first housing 10 is consequently pulled off from the second housing 12. As this pulling-off movement progresses, those parts of the unlocking ring which form the unlocking slopes 42 move upward past the locking protrusions 32 until, finally, the entire locking ring 38 has also come away from the second housing. As soon as the unlocking ring is let go, the force of gravity and the restoring forces of the locking clips 26 ensure that the unlocking ring returns again into the starting position according to FIG. 1 relative to the first housing 10.

Figure 3:
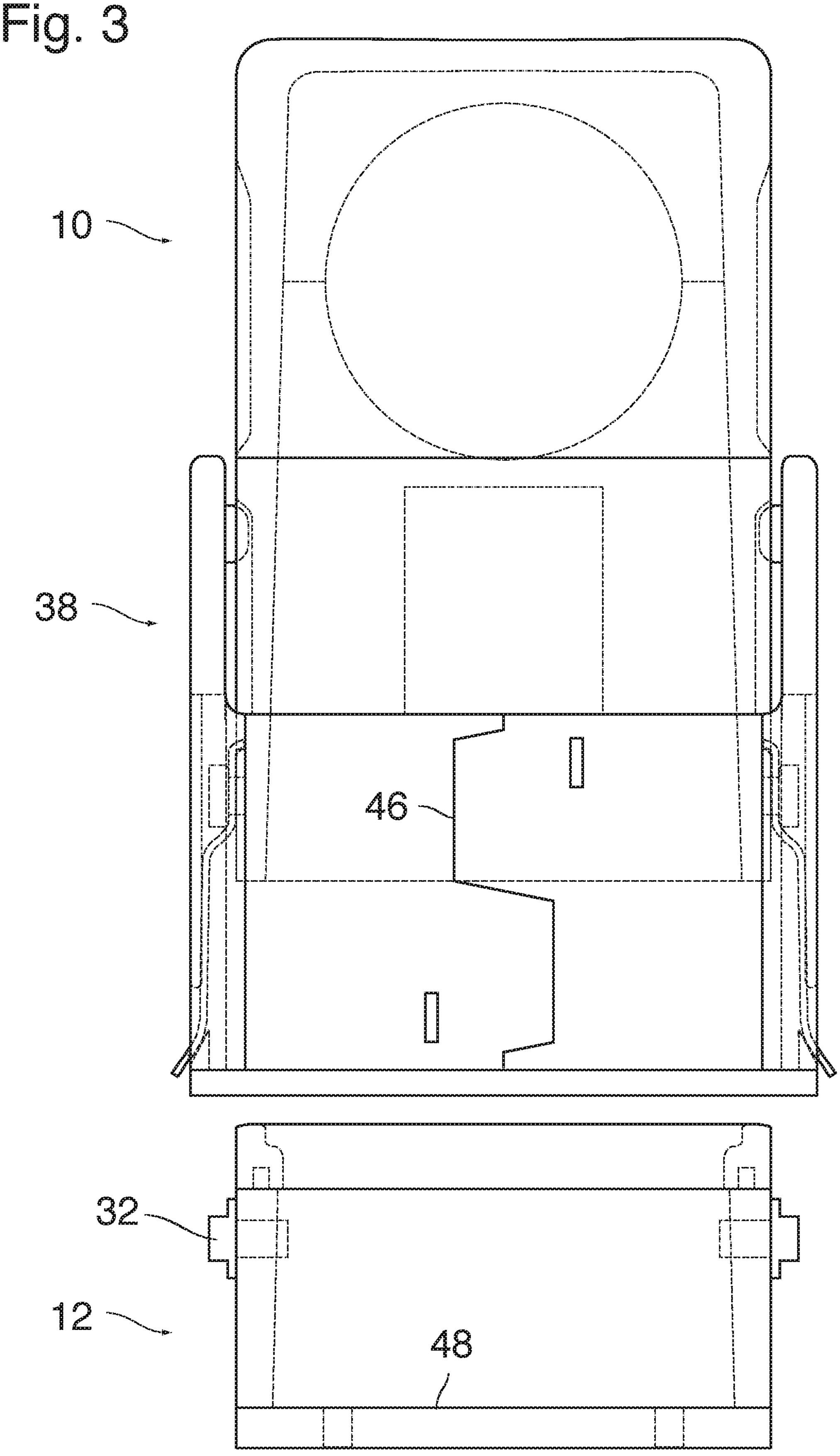
FIG. 3 shows a front view of the two housings released from one another after having been unlocked.

FIG. 3 shows a view in which the housings 10, 12 have been fully released from one another, but the unlocking ring 38 is still located in its raised position relative to the housing 10. It can be seen in this view that the unlocking ring 38 is subdivided, along a dividing line 46, into two latched-together half-shells. The lower housing 12 has on its lower edge, on the front side and on the rear side, a connection flange 48, which allows attachment to a further structural part (not shown).

Figure 4:
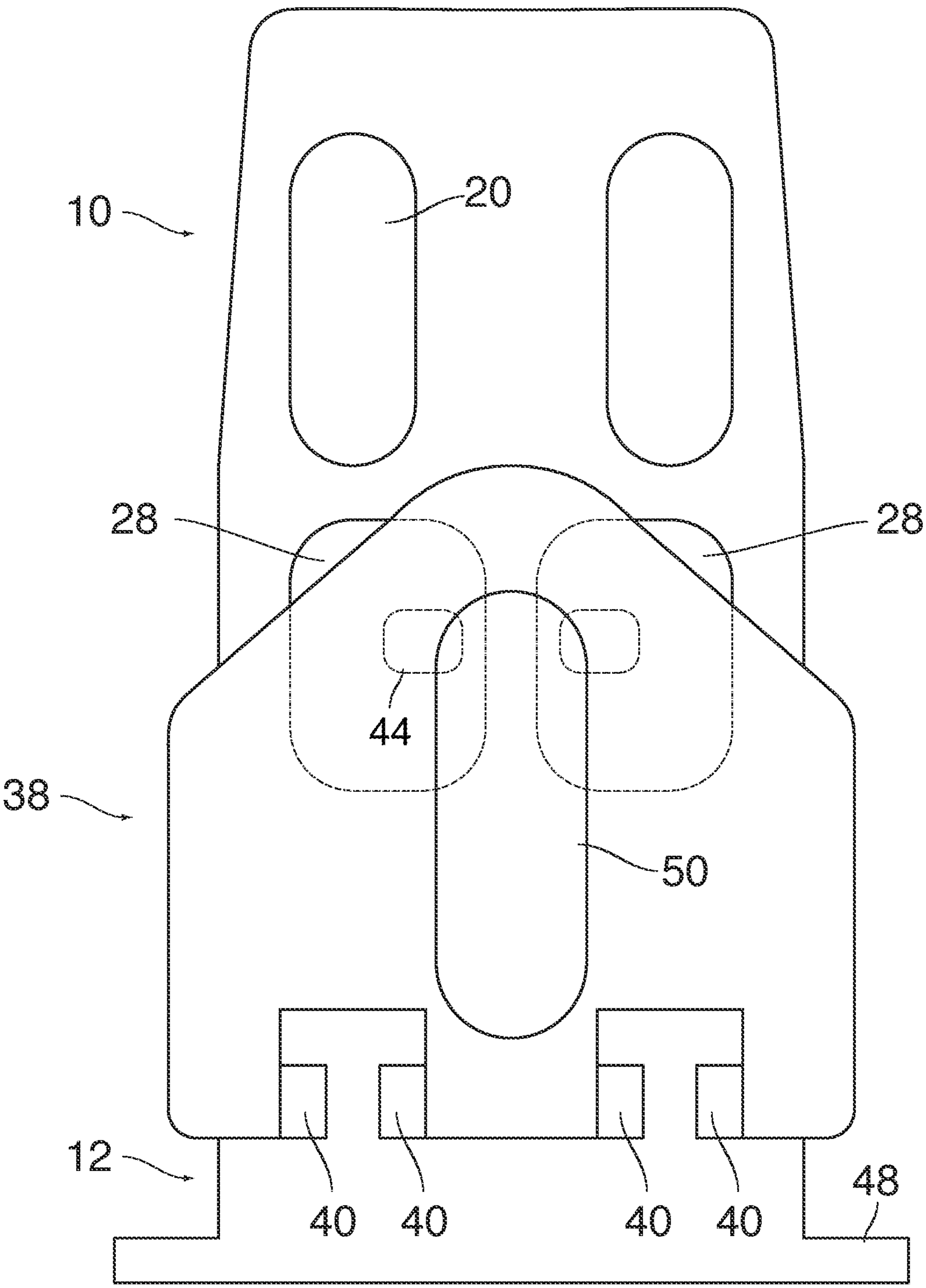
FIG. 4 shows a side view of the housings locked on one another.

FIG. 4 shows a side view of the housings 10, 12 in the locked state. The side walls of the housing 10, of which one is partially visible in this view, have two hollows 28, in which a respective one of the protrusions 44 is guided. The protrusions 44 are located on a triangular extension, which extends the relevant limb of the unlocking ring 38 in the upward direction. Two sets of unlocking slopes 42 are formed on the lower edge of this limb, one set for each of the two locking clips which are located on this side of the housing 10. A grip hollow 50 is formed in the centre of this limb of the unlocking ring, the grip hollow making it easier for the unlocking ring to be gripped and adjusted.

The invention claimed is:

1. A locking device for line connectors, comprising:

a first housing (10) and a second housing (12), which can be placed against one another in an engagement direction (A);

a set of elastic locking clips (26), which are retained on the first housing (10) by fastening rivet pins (24) embedded in a circumferential wall of the first housing (10) and configured to be locked with latching action on locking protrusion rivet pins (32) embedded in a circumferential wall of the second housing (12); and an unlocking ring (38), which is displaceable on the first housing (10) and the second housing (12) in the engagement direction (A) and has unlocking slopes (42) for transferring the locking clips (26) into an unlocked position, wherein the unlocking ring (38) comprises, on an inside, a respective pocket (40) for each of the locking clips (26), wherein each respective pocket (40) is configured to receive, in a locked position, a respective one of the locking clips (26), a respective one of the fastening rivet pins (24), and a respective one of the locking protrusion rivet pins (32), and to limit an outward-pivoting movement of the respective locking clip (26).

2. The locking device as claimed in claim 1, wherein the locking clips (26) are spring plates which are riveted to an outside of the circumferential wall of the first housing (10) by the fastening rivet pins (24).

3. The locking device as claimed in claim 1, wherein each locking clip (26) has an opening (30) for engaging a head of a respective one of the locking protrusion rivet pins (32).

4. The locking device as claimed in claim 1, wherein each of the locking clips (26) comprises an outward-spread portion which forms a run-on slope (36) for one of the locking protrusion rivet pins (32), wherein the outward-spread portion is directed toward the second housing (12).

5. The locking device as claimed in claim 4, wherein the unlocking slopes (42) of the unlocking ring (38) are arranged such that they act on the outward-spread portions of the locking clips (26) forming the run-on slopes (36).

6. The locking device as claimed in claim 1, wherein a displacement path of the unlocking ring (38) relative to the first housing (10) is delimited in both directions by stops.

7. The locking device as claimed in claim 6, wherein one of the stops is formed by one end of the pocket (40) and by a rivet head of the fastening rivet pin (24).

8. The locking device as claimed in claim 6, wherein one of the stops is formed by a protrusion (44) which protrudes from the unlocking ring (38) towards the circumferential wall of the first housing (10) and engages in a hollow (28) formed therein.

* * * * *